Jan. 21, 1958  E. A. BENDER  2,820,657
CONNECTING MEANS FOR STRUCTURAL ELEMENTS
Filed June 26, 1952  2 Sheets-Sheet 1

INVENTOR
EMIL A. BENDER
BY John F. Phillips
ATTORNEY

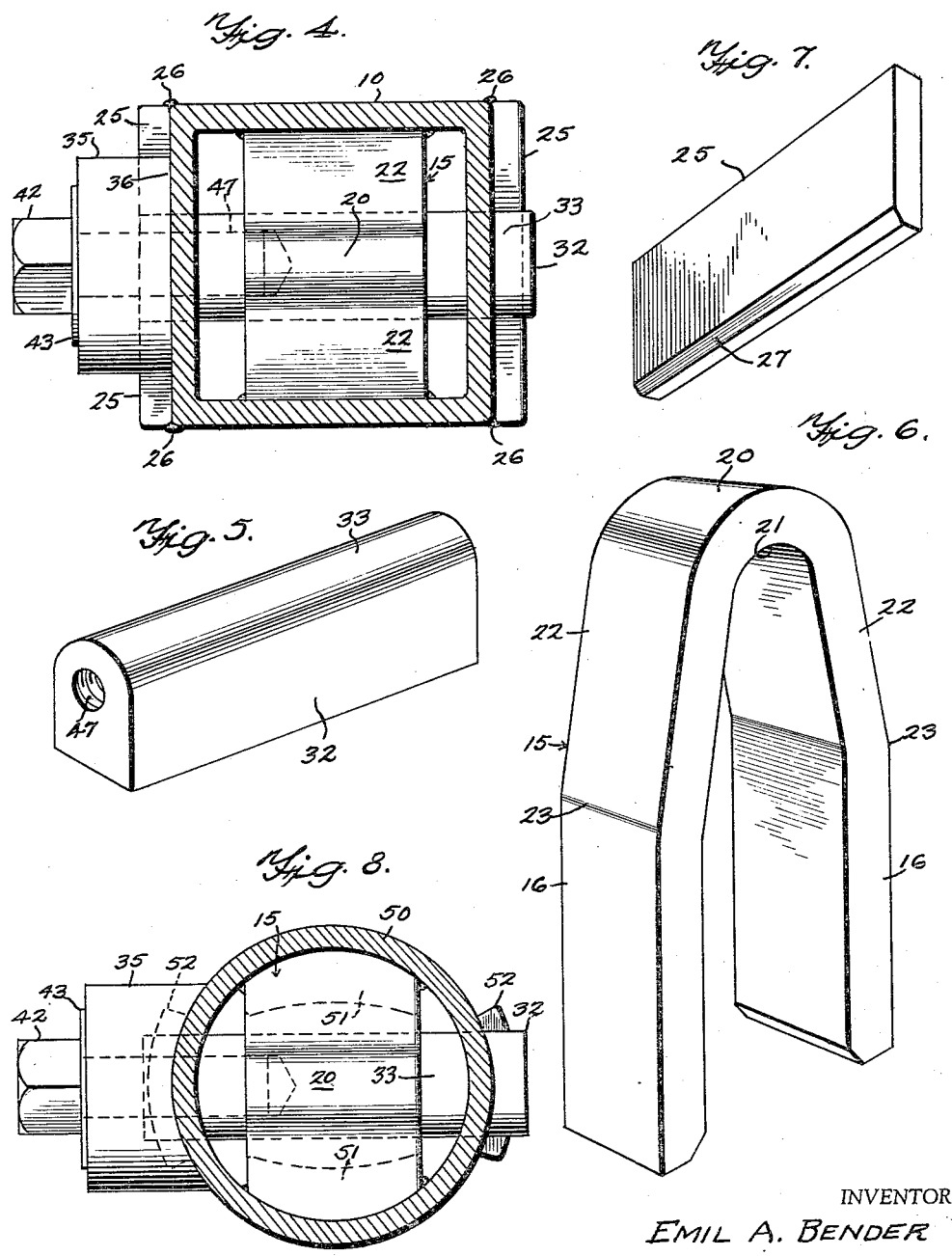

United States Patent Office 2,820,657
Patented Jan. 21, 1958

2,820,657

CONNECTING MEANS FOR STRUCTURAL ELEMENTS

Emil A. Bender, Bakersfield, Calif.

Application June 26, 1952, Serial No. 295,759

14 Claims. (Cl. 287—103)

This invention relates to connecting means for structural elements, and more particularly to means for connecting the sections of the legs of oil well derricks.

For many years a serious problem has been involved in the fabrication of oil-well derricks, due to the difficulty and expense involved in rapidly connecting the sections of the derrick legs in end-to-end relation. This previously has been done on derrick legs of various cross-sectional shapes by drilling the leg sections for the bolting thereto of connecting plates. Such previous connecting devices have been open to a number of objections. For example, it is difficult to drill the openings for the bolts in exactly the correct positions, and frequently these bolts have been subjected to severe shear stresses which would cause them to fail under the strains to which they are subjected in use.

An important object of the present invention is to provide a novel means for connecting in end-to-end relation structural elements such as the sections of the legs of oil-well derricks wherein the assembling of the parts may be carried out far more quickly and accurately than has been possible in prior constructions.

A further object is to provide such a construction wherein elements of the structure cooperate to guide the derrick leg sections accurately in end-to-end relation for the fixing of such sections to each other, plus greatly simplifying and speeding up the assembly operation.

A further object is to provide such a construction which functions to seat the lower end of a derrick leg section solidly and accurately on the upper end of the next lower derrick leg section, the parts cooperating to guide the leg sections into such end-to-end relation and to clamp the upper leg section relative to the lower leg section.

A further object is to provide such a structure wherein an inner element is employed within the leg sections to transmit reaction forces downwardly on the upper leg section and upwardly on the lower leg section to solidly seat the contacting ends of the leg sections against each other, and wherein such inner element is carried by one of the leg sections and engages the other leg section as these sections are brought together to assist in guiding them into cooperative relation with each other.

A further object is to provide a structure of the character just referred to, wherein the inner element guides the leg sections into cooperative engaging relation in one direction, and wherein auxiliary means cooperates between the leg sections to guide them into position in a direction perpendicular to said first-named direction.

A further object is to provide such a structure wherein a wedge element cooperates with the inner element referred to, to effect the clamping action of the leg sections in end-to-end relation, and to employ the auxiliary guide means to increase the seating surface of the wedge in transmitting its reaction forces to one of the leg sections, thus materially strengthening the device.

Other objects and advantages of the invention will become apparent during the course of the following description.

In the drawings I have shown two embodiments of the invention. In this showing:

Figure 4 is a section on line 4—4 of Figure 2;

Figure 5 is a detail perspective view of the wedge;

Figure 6 is a similar view of the wedge-engaging and leg-section-guiding means;

Figure 7 is a similar view of one of the guide plates which serves also as a wedge seat; and Figure 8 is a sectional view similar to Figure 4, showing a modified form of the invention in use with derrick legs or other structural elements of circular cross section.

Figure 1:
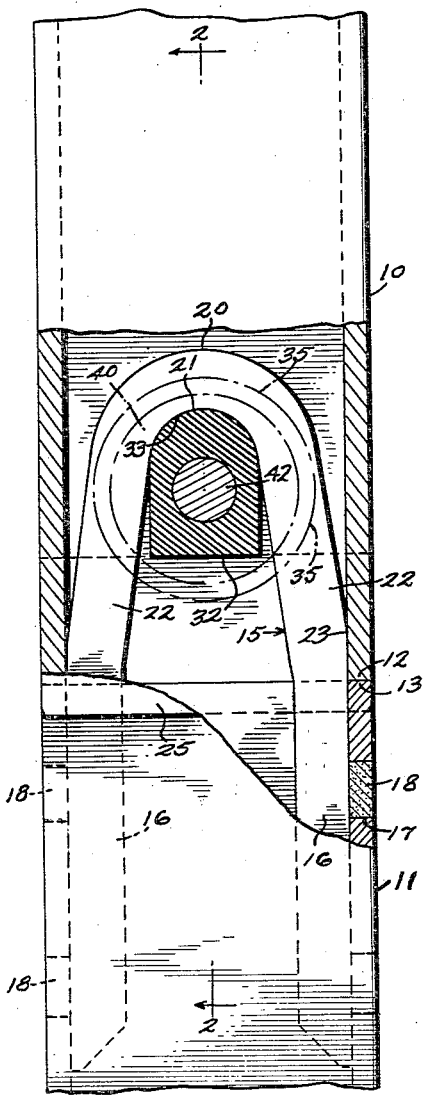
Figure 1 is a fragmentary side elevation of the adjacent ends of two derrick leg sections showing the present invention in use, parts being broken away and parts being shown in section.

Referring to Figure 1, the numeral 10 designates a derrick leg section which is to be connected to a next lower leg section 11. These leg sections are preferably of closed cross section and are shown in Figure 4 as being square in cross section. It will become apparent, however, that the present invention is not limited in its application to such specific type of derrick legs, and it also will be apparent that the invention is not limited to the connection of derrick leg sections but may be used with other analogous structural elements.

The lower extremity of the leg section 10 is preferably cut off square, as at 12, while the upper end of the leg section 11 is similarly cut as at 13, these two end surfaces being seated against each other with the leg sections in aligned relation. It is the connection of the leg sections of the derrick in this manner which has been found to involve substantial expense and difficulties with structures now in use.

Figure 2:
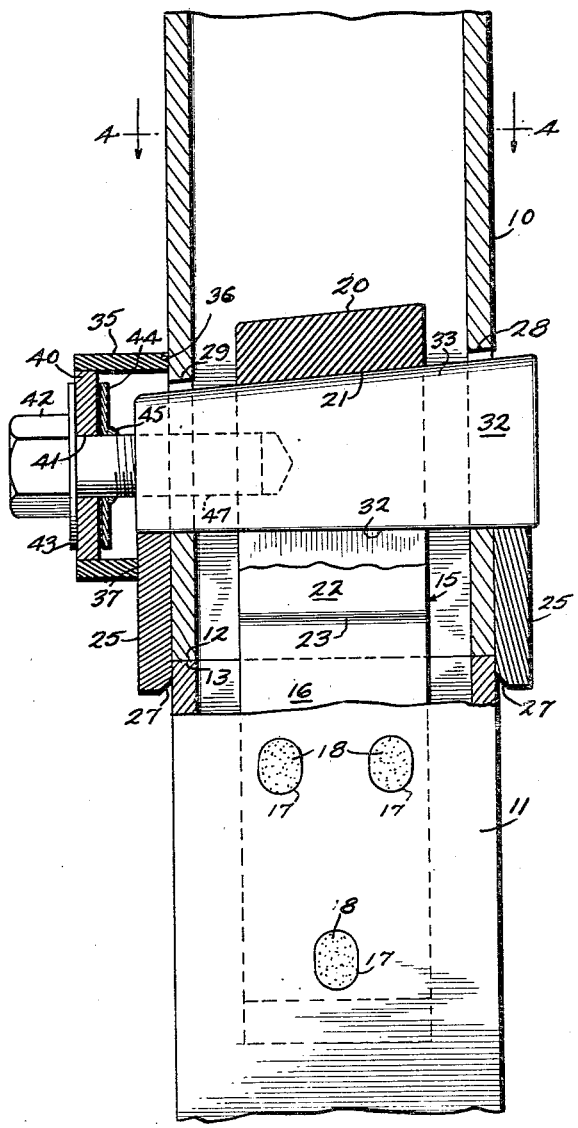
Figure 2 is a section on line 2—2 of Figure 1, parts being shown in elevation.

Referring particularly to Figures 1, 2, and 6, the numeral 15 designates a relatively heavy steel guiding and connecting element which may be substantially of "hairpin" shape, as shown. This member comprises legs the lower end portions 16 of which are parallel to each other and the distance between the outer surfaces of the legs 16 is approximately equal to, and not greater than, the internal width of the leg section 11 when the member 15 is assembled as shown in Figures 1 and 2. The leg section 11 is provided with openings 17 extending therethrough on the opposite sides corresponding to the sides of the leg section 11 engaged by the legs 16 of the member 15. These openings 17 are plug welded, as at 18, to fix the member 15 with respect to the leg section 11.

The upper end of the member 15 is formed as a loop 20 having an inner surface 21 preferably semi-cylindrical in shape and sloped from the horizontal as shown in Figure 2 for a purpose to be described. Below the loop 20 the legs of the member 15 slope downwardly and outwardly as at 22 and join the leg portions 16 approximately at the lines 23, which lines lie above the ends 12 and 13 of the leg sections 10 and 11, as shown in Figure 1.

It will become apparent that in assembling the leg section 10 relative to the section 11 by moving it downwardly thereover, the tapered leg portions 22 guide the leg section 10 into position over the leg section 11 in one direction, namely from top to bottom as viewed in Figure 4. Means are provided for guiding the leg section 10 in a perpendicular direction, that is, right and left in Figure 4, and such means comprises a pair of plates 25 one of which is shown in detail in Figure 7. These plates are welded, for example at 26 (Figure 4) against opposite faces of the leg section 10 and have their lower extremities extending beyond the lower extremity 12 of the leg section 10, as clearly shown in Figure 2. The lower ends of the members 25 at their inner edges are chamfered as at 27, and it will be apparent that as the leg section 10 is assembled over the leg section 11, the chamfered edges 27 assist in positioning the leg section 10 by movement thereof right or left as may be required, as viewed in Figure 2. Thus the members 15 and 25 cooperate with each other in properly positioning the derrick leg section 10 and end-to-end relation with the section 11.

The sides of the leg section 10 which carry the plates 25 are provided respectively with openings 28 and 29. These openings have their lower edges horizontal and lying in a common plane and also in the plane of the upper extremities of the plates 25, as clearly shown in Figure 2. The opening 28 is substantially higher than the opening 29 to accommodate a wedge 32 which is slipped through these openings from right to left as viewed in Figure 2, in assembling the parts. The top 33 of the wedge 32 is semi-cylindrical in shape and has its slope corresponding to the inclination of the surface 21 from the horizontal so that the top of the wedge fits the surface 21 throughout the width of the member 15. The cooperating or contacting surfaces of the wedge and loop 20 are preferably semi-cylindrical as stated, but it will be obvious that they are not limited to such specific shape.

Figure 3:
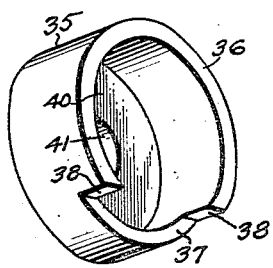
Figure 3 is a detail perspective view of the seat for the wedge take-up screw.

Means are provided for moving the wedge 32 endwise to the left as viewed in Figure 2. Such means comprises a cylindrical sleeve 35 (Figures 2 and 3) the inner edge 36 of which seats against the adjacent face of the leg section 10. The bottom portion of the sleeve 35 is cut away as at 37 to form a recess receiving the adjacent plate 25, this cut-away portion having opposite horizontal shoulders 38 which seat on the top of the adjacent plate 25 to fix the sleeve 35 against rotation.

An end plate 40 is welded in the sleeve 35 and is apertured as at 41 to receive a cap screw 42 beneath the head of which is arranged a washer 43. This washer is arranged adjacent the outer face of the plate 40, and arranged adjacent the inner face of such plate is a second washer 44, preferably welded as at 45 to the shank of the cap screw 42. When the parts are thus assembled, the cap screw is assembled with respect to the sleeve 35 and associated elements so as to become a permanent part of the assembly and thus prevent its accidental loss. The inner end of the cap screw is threaded in an opening 47 formed in the smaller end of the wedge 32.

As previously stated, the present invention is not limited in its use to derrick leg or similar structures of square cross section, and as illustrating the application of the invention to structural members of other cross sections, attention is invited to Figure 8 wherein a structural element 50 of circular cross section is illustrated. It will be apparent, however, that the invention has particular use with reference to structural elements of closed cross section. In Figure 8, the connecting member 15 is shown as having arcuate legs 51 so that the outer surfaces thereof below the lines 23 will fit into the structural member 50 of circular section. In this case, plates 52 similar to the plates 25 are employed but are curved to correspond to the curvature of the outer surface of the structural member 50. Otherwise, the parts in Figure 8 may be substantially identical with those previously described and they function in the same manner.

Operation

The upper end of each derrick leg section above which another section is to be arranged is provided with one of the members 15 welded in position as at 18. Similarly, the lower end of each leg section which is to be arranged above the next lower leg section is provided with two of the plates 25 welded thereto and is also provided with the wedge-receiving openings 28 and 29. In assembling the parts, the upper leg section 10 is arranged over a next lower leg section 11 and moved downwardly into position thereon. The tapered leg portions 22 of the member 15 guide the leg section in one direction while in the direction at right angles thereto, the chamfered edges 27 guide the leg section 10 into position. The leg ends 12 and 13 are thus brought into contacting relation, whereupon one of the wedges 32 is inserted through the openings 28 and 29, from right to left as viewed in Figure 2, the wedge passing through the loop 20 of the member 15. If the washer 44 in Figure 2 is employed, this washer obviously positions the screw 42 against axial movement and when the wedge 32 is inserted, it can be moved initially only into engagement with the end of the screw 42, assuming that the sleeve 35 and associated elements previously have been placed in position. Alternatively, the wedge 32 may be inserted in the manner stated and pushed to the left as far as possible, after which the sleeve 35 and the elements associated therewith may be moved into a position with the threaded end of the screw 42 in alignment with the opening 47 in the wedge. In either case, rotation of the screw 42 by means of a suitable wrench will thread the shank of the screw into the opening 47, and with the shoulders 38 seating on the adjacent member 25, the sleeve 35 will be prevented from turning. The screw 42 may be turned until the wedge 32 is pulled by tightly into position. This tightening action transmits an upward reaction to the loop 20 and thus through the member 15 to the lower leg section 11. A downward reaction is transmitted to the leg section 10 through the lower edges of the openings 28 and 29 and the upper edges of the plates 25. Thus the upper leg section will be accurately and rigidly held in position and the operations referred to may be very quickly and easily carried out with no skill on the part of the operator.

The member 15 serves two functions, as will be apparent from the foregoing. In assembling the parts, the opposite sides of the leg section 10, as viewed in Figure 1, will slide along one or the other of the tapered leg portions 22 to be guided thereby into position, and the lower extremity of the leg section 10 will be accurately positioned over the leg section 11 as soon as such lower extremities 12 reach the lines 23 of the legs of the member 15. Thus, the member 15 serves as a guide in assembling the parts. In addition thereto, the member 15 serves as means engageable with the wedge 32 to transmit upward reaction forces to the leg section 11 to hold the upper edge 13 thereof tightly seated against the lower edge 12 of the leg 10.

The plates 25 also serve two distinct functions. As the member 15 guides the leg section 10 in one direction as it is moved downwardly over the leg section 11, the chamfered edges 27 of the plates 25 guide the lower end of the leg section 10 in a perpendicular direction. The cooperation of these two guiding means greatly facilitates the accurate placing of the leg section 10 in position and these leg sections cannot move horizontally relative to each other in any direction after the ends 12 and 13 have been brought into engagement with each other, since the means 15 and 25 not only serve as guide means but as positioning means to hold the leg sections 10 and 11 in proper position until the wedge 32 is inserted. As an additional function of the plates 25, it will be noted that the upper edges of these plates lie in the common horizontal plane of the lower extremities of the openings 28 and 29. Thus, the flat bottom of the wedge 32 seats upon relatively broad bearing surfaces at opposite sides of the derrick leg to more effectively transmit downward reaction forces to the leg section 10.

The operation of the form of the device shown in Figure 8 corresponds to that previously described, and such operation need not be referred to in detail. The member 15 guides the parts in one direction while the plates 52 similarly guide the parts in a perpendicular direction and maintain the parts in proper alignment pending the placing in position and drawing up of the wedge 32.

In actual practice it has been found that the present construction is not only more economical to manufacture than prior derrick-leg-connecting means, but it also has been found that labor costs in derrick erection have been reduced because of the ease and speed with which adjacent derrick leg sections may be assembled. Moreover, the construction is extremely rugged and will not fail under the influence of strains to which the derrick is subjected, as has been found frequently to occur with prior connecting means.

I claim:

1. A structure for guiding and connecting in end-to-end relation a pair of structural elements of corresponding closed hollow cross section, comprising a first guiding means carried by one of said structural members and engageable with the other structural member to guide the latter laterally in one direction relative to said one structural member, a second guiding means carried by said other structural member and engageable with said one structural member to guide said other structural member laterally in a direction at right angles to the guiding direction of said first guiding means, said first guiding means being fixed within said one structural member and projecting beyond the end thereof and tapered to decrease in size for engagement wholly within said other structural member, and means engaged between the tapered portion of said first guiding means and said other structural member for fixing said structural members in end-to-end relation.

2. A structure for guiding and connecting in end-to-end relation a pair of structural elements of corresponding closed hollow cross section, comprising a first guiding means carried by one of said structural members and engageable with the other structural member to guide the latter laterally in one direction relative to said one structural member, a second guiding means carried by said other structural member and engageable with said one structural member to guide said other structural member laterally in a direction at right angles to the guiding direction of said first guiding means, said first guiding means being fixed within said one structural member and projecting beyond the end thereof and tapered to decrease in size for engagement wholly within said other structural member, and a wedge device engaged between the tapered end of said first guiding means and said other structural member and movable laterally thereof to create opposite endwise reactions on said structural members to clamp them in end-to-end relation.

3. A structure for guiding and connecting in end-to-end relation a pair of structural elements of corresponding closed hollow cross section, comprising a first guiding means carried by one of said structural members and engageable with the other structural member to guide the latter laterally in one direction relative to said one structural member, a second guiding means carried by said other structural member and engageable with said one structural member to guide said other structural member laterally in a direction at right angles to the guiding direction of said first guiding means, said first guiding means being fixed within said one structural member and projecting beyond the end thereof and tapered to decrease in size for engagement wholly within said other structural member, said tapered end of said first guiding means terminating in a loop and said other structural member having openings at opposite ends of said loop, and a wedge inserted through said openings and through said loop and adapted to be moved laterally of said other structural member to transmit opposite reactions to said structural members to clamp them in end-to-end relation.

4. In combination with a pair of structural members adapted to be brought into end-to-end relation, having at the ends to be joined, corresponding cross sections, said cross sections constituting a closed geometrical figure, a pair of guide plates carried by one of said structural members and projecting beyond the end thereof which is to be brought into engagement with the adjacent end of the other structural member, said plates being engageable with opposite outer face portions of said other structural member to guide said structural members laterally into engagement with each other, guide means carried by said other structural member and projecting therefrom to engage said one structural member to guide the latter laterally at right angles to the guiding direction of said plates whereby said plates and said guiding means cooperate to position said structural members accurately in end-to-end relation, and connecting means engaged between said guide means and said one structural member for fixing said structural members in end-to-end relation.

5. The combination defined in claim 4 wherein said connecting means comprises a device engaged with said guiding means and with said one structural member to transmit opposite reactions endwise of said structural members to clamp them in end-to-end relation.

6. In combination with a pair of structural members adapted to be brought into end-to-end relation, having at the ends to be joined, corresponding cross sections, said cross sections constituting a closed geometrical figure, a pair of guide plates carried by one of said structural members and projecting beyond the end thereof which is to be brought into engagement with the adjacent end of the other structural member, said plates being engageable with opposite outer face portions of said other structural member to guide said structural members laterally into engagement with each other, guide means carried by said other structural member and projecting therefrom to engage said one structural member to guide the latter laterally at right angles to the guiding direction of said plates whereby said plates and said guiding means cooperate to position said structural members accurately in end-to-end relation, said guiding means having one end projecting endwise beyond said other structural member and insertable in said one structural member and terminating in a closed loop, and a pin inserted through said loop and through said one structural member fixing said structural members in end-to-end relation.

7. The combination defined in claim 6 wherein said pin comprises a wedge having a flat face perpendicular to the axis of said structural members when the latter are in end-to-end relation and said one structural member having openings provided with edge portions lying in a common plane perpendicular to said axis and engageable with said flat face of said wedge, the edge of said wedge opposite the flat face being tapered whereby, when said wedge is moved through said loop and through said openings in one direction it creates opposite reaction forces on said structural members to clamp them in end-to-end relation.

8. A pair of structural members adapted to be brought into end-to-end relation, having at the ends to be joined, corresponding cross sections, said cross sections constituting a closed geometrical figure, a pair of guide plates carried by one of said structural members and projecting beyond the end thereof which is to be brought into engagement with the adjacent end of the other structural member, said plates being engageable with opposite outer face portions of said other structural member to guide said structural members laterally into endwise engagement with each other, guide means carried by said other structural member and projecting therefrom to engage said one structural member to guide the latter laterally perpendicular to the guiding direction of said plates whereby said plates and said guiding means cooperate to position said structural members accurately in end-to-end relation, said guiding means having one end projecting endwise beyond said other structural member and insertable in said one structural member and terminating in a closed loop, and a wedge inserted through said loop and through said one structural member, said wedge having a flat face perpendicular to the axis of said structural members when the latter are in end-to-end relation, said one structural member having openings provided with edge portions lying in a common plane perpendicular to said axis and engaging with said flat face of said wedge, the edge of said wedge opposite the flat face being tapered whereby, when said wedge is moved through said loop and through said openings in one direction it creates opposite reaction forces on said structural members to clamp them in end-to-end relation, said plates having edges respectively coincident with said edges of said openings to cooperate therewith to present bearing surfaces of substantial area to said flat face of said wedge.

9. In combination with a pair of structural elements adapted to be brought into end-to-end relation, having at the ends to be joined, corresponding cross sections, said cross sections constituting a closed geometrical figure in substantially vertical position, a pair of plates carried by one of said structural members against opposite face portions thereof and projecting beyond the end of such member, such projecting ends of said plates having inner chamfered edges to relatively guide the ends of said structural members into alignment laterally thereof when the ends of said structural members are brought together, a substantially V-shaped guide member having legs provided with parallel end portions lying within and fixed against opposite inner face portions of the other structural member, the other end of said guide member being tapered to decrease in width and projecting beyond the end of said other structural member for insertion in said one structural member to guide said structural members laterally of said structural members and perpendicular to the guiding direction of said plates, the projecting portion of said guiding member which is inserted into said first member terminating in a closed loop, and a pin inserted through said loop and through said one member to fix said structural members in end-to-end relation.

10. The combination defined in claim 9 wherein said pin comprises a wedge having a flat face perpendicular to the axis of said one member and such one member having opposite openings each provided with an edge engageable by said flat face, said edges lying in a common plane perpendicular to said axis, the opposite edge of said wedge being inclined relative to said flat face and engageable within said loop whereby endwise movement of said wedge clamps said structural members in end-to-end relation.

11. The combination defined in claim 9 wherein said pin comprises a wedge movable laterally of said axis to transmit opposite reactions to said guiding member and said one structural member upon movement of said wedge transversely to said axis, a seat engageable against one side of said one member, and a screw extending through said seat and having a head engageable against said seat, said wedge having a threaded opening receiving said screw.

12. The combination defined in claim 9 wherein said pin comprises a wedge having a flat face perpendicular to the axis of said one member and such one member having opposite openings each provided with an edge engageable by said flat face, said edges lying in a common plane perpendicular to said axis, the opposite edge of said wedge being inclined relative to said flat face and engageable within said loop whereby endwise movement of said wedge clamps said structural members in end-to-end relation, said plates having the edges thereof remote from the end of said one structural member respectively coincident with said edges of said opening to cooperate therewith to present bearing surfaces of substantial area to said flat face of said wedge.

13. The combination defined in claim 9 wherein said pin comprises a wedge movable laterally of said axis to transmit opposite reactions to said guiding member and said one structural member upon movement of said wedge transversely to said axis, a seat engageable against one side of said one member, and a screw extending through said seat and having a head engageable against said seat, said wedge having a threaded opening receiving said screw, said plates having the edges thereof remote from the end of said one structural member respectively coincident with said edges of said opening to cooperate therewith to present bearing surfaces of substantial area to said flat face of said wedge.

14. The combination defined in claim 9 wherein said pin comprises a wedge having a flat face perpendicular to the axis of said one member and such one member having opposite openings each provided with an edge engageable by said flat face, said edges lying in a common plane perpendicular to said axis, the opposite edge of said wedge being inclined relative to said flat face and engageable within said loop whereby endwise movement of said wedge clamps said structural members in end-to-end relation, said plates having the edges thereof remote from the end of said one structural member respectively coincident with said edges of said opening to cooperate therewith to present bearing surfaces of substantial area to said flat face of said wedge, a seat comprising a sleeve engageable against one side of said one structural member and having a shoulder engageable with said edge of the adjacent plate, and a screw extending through said seat and having a head engageable therewith, said wedge having a threaded opening receiving said screw.

References Cited in the file of this patent

UNITED STATES PATENTS

| Number | Name | Date |
|---|---|---|
| 202,473 | Rowell | Apr. 16, 1878 |
| 295,559 | Kitson | Mar. 25, 1884 |
| 329,545 | Foley | Nov. 3, 1885 |
| 419,589 | Lewis | Jan. 14, 1890 |
| 545,375 | Olds | Aug. 27, 1895 |
| 1,189,802 | Eckert | July 4, 1916 |
| 1,570,226 | Bosco | Jan. 19, 1926 |
| 1,823,971 | Erlandson | Sept. 22, 1931 |
| 2,248,845 | Beam | July 8, 1941 |
| 2,470,282 | Baker et al. | May 17, 1949 |
| 2,475,046 | Pedersen | July 5, 1949 |
| 2,589,952 | Mercier | Mar. 18, 1952 |

FOREIGN PATENTS

| Number | Country | Date |
|---|---|---|
| 143,729 | Great Britain | June 3, 1920 |